(12) United States Patent
Wang et al.

(10) Patent No.: US 9,070,972 B2
(45) Date of Patent: Jun. 30, 2015

(54) WIDEBAND BEAM FORMING DEVICE; WIDEBAND BEAM STEERING DEVICE AND CORRESPONDING METHODS

(75) Inventors: Qi Wang, Stuttgart (DE); Richard Stirling-Gallacher, Dallas, TX (US); Ralf Boehnke, Esslingen (DE)

(73) Assignee: Sony Corporation, Tokyo (JP)

( * ) Notice: Subject to any disclaimer, the term of this patent is extended or adjusted under 35 U.S.C. 154(b) by 468 days.

(21) Appl. No.: 13/494,549

(22) Filed: Jun. 12, 2012

(65) Prior Publication Data

US 2013/0002488 A1    Jan. 3, 2013

(30) Foreign Application Priority Data

Jun. 30, 2011 (EP) ..................................... 11172218

(51) Int. Cl.
| | |
|---|---|
| H01Q 3/00 | (2006.01) |
| H01Q 3/22 | (2006.01) |
| G01S 13/34 | (2006.01) |
| G01S 13/26 | (2006.01) |
| G01S 13/89 | (2006.01) |
| G01S 13/02 | (2006.01) |
| G01S 13/88 | (2006.01) |

(52) U.S. Cl.
CPC .................. *H01Q 3/22* (2013.01); *G01S 13/34* (2013.01); *G01S 13/0209* (2013.01); *G01S 13/26* (2013.01); *G01S 13/887* (2013.01); *G01S 13/89* (2013.01)

(58) Field of Classification Search
CPC ............... H01Q 3/00; G01S 3/16; G01S 3/28; G01S 13/89; G01S 13/0209; G01S 13/887
USPC .......................................... 342/368, 378, 383
See application file for complete search history.

(56) References Cited

U.S. PATENT DOCUMENTS

| 5,592,179 A | 1/1997 | Windyka |
|---|---|---|
| 6,940,917 B2 | 9/2005 | Menon et al. |

(Continued)

FOREIGN PATENT DOCUMENTS

DE    10 2008 054 624 A1    6/2010

OTHER PUBLICATIONS

Zhen Hu et al., "Design of Look-up Table Based Architecture for Wideband Beamforming", 2010 International Waveform Diversity and Design Conference, Aug. 8-13, 2010, pp. 1-5.

(Continued)

*Primary Examiner* — Harry Liu
(74) *Attorney, Agent, or Firm* — Oblon, McClelland, Maier & Neustadt, L.L.P.

(57) ABSTRACT

A beam forming device and method as well as to a beam steering device and method are described. The imaging beam forming device comprises a wideband transmit unit comprising at least one transmit antenna, a receiver unit comprising at least two receive antennas and at least one receive element that receive radiation from said scene and that generate receive signals from said received radiation, and a beam forming unit that performs beam forming to form a receive beam and obtain beam formed output signals from said receive signals by use of beam forming weights. For different samples or groups of subsequent samples of a receive signal, a sample representing said receive signal at a different frequency, a frequency-dependent weight is used for beam forming, which frequency-dependent weights are adapted to result in a predetermined shape of said receive beam.

23 Claims, 9 Drawing Sheets

(56) References Cited

U.S. PATENT DOCUMENTS

| | | | |
|---|---|---|---|
| 8,665,693 B1* | 3/2014 | Cheng et al. | 370/204 |
| 2003/0142015 A1 | 7/2003 | Boe et al. | |
| 2009/0258609 A1* | 10/2009 | Miyoshi | 455/101 |
| 2010/0329393 A1* | 12/2010 | Higuchi | 375/340 |
| 2011/0105032 A1* | 5/2011 | Maruhashi et al. | 455/59 |
| 2011/0164519 A1* | 7/2011 | Nishio et al. | 370/252 |
| 2012/0045024 A1* | 2/2012 | Cui et al. | 375/341 |
| 2012/0146844 A1 | 6/2012 | Stirling-Gallacher et al. | |

OTHER PUBLICATIONS

Zhen Hu et al., "Robust Wideband Beamforming", IEEE National Aerospace and Electronics Conference, Jul. 14-16, 2010, 5 Pages.

Ben Mathews et al., "Wideband Radar Adaptive Beamforming Using Frequency-Domain Derivative Based Updating", Proceedings of Software defined Radio Forum, Nov. 2007, 6 Pages.

Moon-Sik Lee, "Wideband Capon Beamforming for a Planar Phased Radar Array with Antenna Switching", ETRI Journal, vol. 31, No. 3, Jun. 2009, pp. 321-323.

Graham M. Brooker, "Understanding Millimetre Wave FMCW Radars", $1^{st}$ International Conference on Sensing Technology, Nov. 21-23, 2005, Palmerston North, New Zealand, pp. 152-157.

S. D. Hayward et al., "Adaptive interference cancellation using time-varying beamforming weights for wideband LFM waveforms", Conference Record of the $34^{th}$ Asilomar Conference on Signals, Systems and Computers, 2000, vol. 1, pp. 30-35.

Extended European Search Report Issued Sep. 21, 2012 in Patent Application No. 12171627.8.

* cited by examiner $T_p$ = flight time
$T_{chirp}$ = chirp duration
$f_b$ = beat frequency
$\Delta_f$ = frequency difference between each sample

WIDEBAND BEAM FORMING DEVICE; WIDEBAND BEAM STEERING DEVICE AND CORRESPONDING METHODS

CROSSREFERENCES TO RELATED APPLICATIONS

The present application claims the benefit of the earlier filing date of 11 172 218.7 filed in the European Patent Office on Jun. 30, 2011, the entire content of which application is incorporated herein by reference.

BACKGROUND

1. Field of the Disclosure

The present disclosure relates to a wideband beam forming device and method and to a wideband beam steering device and method. The present disclosure relates further to an active imaging device and a corresponding method for imaging a scene. Still further, the present disclosure relates to a computer readable non-transitory medium storing such a computer program.

2. Description of Related Art

Active imaging systems including beam forming are becoming more and more popular at ultrasonic, microwave, millimeter and terahertz frequencies for a number of applications including medical and security applications.

The arrangement of transmitter (herein also called "transmit element") and receiver (herein also called "receive element") in an active imaging system may take on many different forms. In an embodiment relevant for the present disclosure multiple transmitters and receivers work together to form a MIMO radar (or MIMO active imaging system). There are predominately two different types of MIMO radars. The first type is called statistical MIMO, in which the antennas (generally the "transmit elements" and the "receive elements") are placed far apart from each other to provide different views of the object (generally the "scene"). The second type of MIMO is called beam forming (or co-located) MIMO in which the antennas are placed close to each and act together to form a "virtual" beam forming array.

For beam forming to be performed at the receiver in a beam forming device, typically multiple receiving antennas are used to perform beam forming. Such an arrangement may use one transmitting antenna or may use multiple transmitting antennas in combination with the multiple receiving antennas to perform MIMO beam forming. Alternatively, beam forming maybe be performed exclusively at the transmitter in a beam steering device with the use of multiple transmitting antennas. It shall be noted here that hereinafter reference is made to a beam steering device and method when beam forming (beam steering) is solely performed on the transmitter side, and that hereinafter reference is made to a beam forming device and method when beam forming is solely performed on the receiver side. In more detail, beam forming and beam steering both use weights to form a beam pattern. The difference is, on the transmitter side, beam steering generally uses only one weight vector to form one beam pattern and radiates it to the space (i.e. only one radiation pattern can exist physically at one time). On the receiver side, digital beam forming could use multiple weight vectors to form multiple beam patterns at the same time in parallel and get multiple beam formed outputs.

Beam forming in one dimension is typically combined with other techniques (i.e. synthetic aperture radar) to form a 2D image. Alternatively, beam forming can be performed in two dimensions to form a 2D image. To yield a full 3D image of an object (or a 2D image with additional distance/depth information), such arrangements typically transmit a wideband continuous waveform (i.e. frequency modulated continuous wave (FMCW)) or a wideband pulse to provide ranging (distance) information.

Most conventional methods to achieve wideband beam forming utilise filter banks. These methods work either in the time domain with two-dimensional filter banks or operate in the frequency domain (after FFT), filtering each band separately. They strive to either split the wideband signal into many sub-bands which are individually narrowband filtered or they strive to provide frequency invariant beam forming.

Exemplary methods to achieve wideband beam forming for radar and communications systems are described in the following documents.

Z. Hu et al, "Design of Look-up Table Based Architecture for Wideband Beam forming", 2010 International Waveform Diversity and Design Conference Aug. 8-13, 2010 describes how to achieve wideband beam forming by either using time filtering in 2D or by using a FFT followed by 1D filtering. In particular, it describes using a 2D filter bank after the ADC. To perform wideband beam forming in this way, the sampling rate of the ADC needs to be more than two times the bandwidth of the transmitted signal.

Z. Hu et al, "Robust Wideband Beam forming", IEEE National Aerospace and Electronics Conference, Jul. 14-16, 2010 describes a method to achieve robust optimisation of wideband beam forming. In the same way as the above mentioned document of Z. Hu wideband beam forming is achieved using a 2D filter after the ADC.

B. Matthews et al, "Wideband Radar Adaptive Beam forming using Frequency Domain derivative based updating", Proceedings of Software defined Radio Forum, November 2007 describes a method to perform wideband adaptive beam forming to mitigate the effect of wideband jammers. In particular, the proposed methods include those described in the above mentioned documents of Z. Hu (i.e. 2D filtering or frequency domain filtering) and additionally propose the computation of a wideband co-variance matrix to find the optimum weights.

M.-S. Lee, "Wideband Capon Beam forming for a planar phased radar array with antenna switching", ETRI Journal, Volume 31, Number 3, June 2009 describes a FMCW system which uses a 2D antenna array in which each row of the 2D antenna array is switched successively to a beam forming array. The weights for the beam former are changed depending upon which row is selected and the correspondingly frequency difference in the chirp waveform which may have occurred during this time. Additionally the paper only addresses the use of capon beam forming which requires calculating the covariance of the received signal.

U.S. Pat. No. 6,940,917 B2 describes a wideband beam steering multi-carrier (or OFDM) communication system. Each of the different frequency carriers are transmitted at the same time and are assigned a different weighting vector.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

SUMMARY

It is an object of the present disclosure to provide a simple and effective beam forming device and a corresponding method for wideband digital beam forming on the receiver side as well as a simple and effective beam steering device and a corresponding method for wideband digital beam steering on the transmitter side, said devices and method enabling simple and effective beam forming for a transmitted and/or a received signal. It is a further object of the present disclosure to provide a corresponding active imaging device and method as well as a computer readable non-transitory medium storing such a computer program.

According to an aspect of the present disclosure there is provided beam forming device for imaging a scene, comprising:

a wideband transmit unit comprising at least one transmit antenna that transmit radiation towards a scene, wherein the frequency of the radiation is changing with time in a deterministic way within a wideband frequency range, a receiver unit comprising at least two receive antennas and at least one receive element that receive radiation from said scene and that generate receive signals from said received radiation, and a beam forming unit that performs beam forming to form a receive beam and obtain beam formed output signals from said receive signals by use of beam forming weights, wherein for different samples or groups of subsequent samples of a receive signal, a sample representing said receive signal at a different frequency, a frequency-dependent weight is used for beam forming, which frequency-dependent weights are adapted to result in a predetermined shape of said receive beam.

According to a further aspect of the present disclosure there is provided beam steering device for imaging a scene, comprising:

a wideband transmit unit comprising at least two transmit antennas that transmit radiation towards a scene, wherein the frequency of the radiation is changing with time in a deterministic way within a wideband frequency range, a receiver unit comprising at least one receive antenna and at least one receive element that receive radiation from said scene and that generate a receive signal from said received radiation, and a beam steering unit that performs beam steering to form a transmit beam from said transmitted radiation by use of beam steering weights, wherein for different samples or groups of subsequent samples of transmitted radiation, a sample representing said transmitted radiation at a different frequency, a frequency-dependent weight is used for beam steering, which frequency-dependent weights are adapted to result in a predetermined shape of said transmit beam.

According to a further aspect of the present disclosure there is provided a beam forming and beam steering device comprising:

a wideband transmit unit comprising at least two transmit antennas that transmit radiation towards a scene, wherein the frequency of the radiation is changing with time in a deterministic way within a wideband frequency range, a receiver unit comprising at least two receive antennas and at least one receive element that receive radiation from said scene and that generate receive signals from said received radiation, a beam steering unit that performs beam steering to form a transmit beam from said transmitted radiation by use of beam steering weights, wherein for different samples or groups of subsequent samples of transmitted radiation, a sample representing said transmitted radiation at a different frequency, a frequency-dependent weight is used for beam steering, which frequency-dependent weights are adapted to result in a predetermined shape of said transmit beam, and a beam forming unit that performs beam forming to form a receive beam and obtain beam formed output signals from said receive signals by use of beam forming weights, wherein for different samples or groups of subsequent samples of a receive signal, a sample representing said receive signal at a different frequency, a frequency-dependent weight is used for beam forming, which frequency-dependent weights are adapted to result in a predetermined shape of said receive beam.

According to still another aspect of the present disclosure an active imaging device including a beam forming device, a beam steering device and/or a beam forming and beam steering device as proposed according to the present disclosure as well as a processing device for processing the their output signals.

According to still further aspects corresponding methods and a computer readable non-transitory medium having instructions stored thereon which, when carried out on a computer, cause the computer to perform the steps of the beam forming method or the beam steering method according to the present disclosure are provided.

Preferred embodiments of the disclosure are defined in the dependent claims. It shall be understood that the claimed devices, the claimed methods and the claimed computer readable medium all have similar and/or identical preferred embodiments as defined in the dependent claims and as described hereinafter.

For any beam forming arrangement, there is usually a bandwidth limitation since the complex weights (which are used at the transmitter and/or at the receiver) to form a particular beam are only valid at one particular frequency. For systems which are transmitting or receiving wideband signals, the formed beam is therefore seriously degraded. Based on this recognition the present disclosure is based on the idea to use a beam forming approach (on the receiver side) and/or a beam steering approach (on the transmitter side) which is applicable for wideband systems in which the frequency of the transmitted and/or received signal is sweeping or varying with time in a known/deterministic way. Possible example applications are FMCW radar systems, frequency hopped communications systems or chirp based communications systems.

The present disclosure thus provides a simple and efficient method to achieve wideband beam forming for a transmitted and/or received signal which changes its frequency with time in a known/deterministic manner. The known methods are either much more complicated than the proposed solution requiring a complicated filtering arrangement and/or primarily deal with signals which are transmitting on many frequencies at the same time.

As explained above, the challenge of wideband beam forming is that a fixed weight vector steers the beam to different directions at different frequency. The known solutions (according to the proposals of Z. Hu or B. Matthews) propose to use 2D filtering or frequency domain filter. M.-S. Lee proposes to use Capon beam forming which requires calculating the covariance of the received signal. U.S. Pat. No. 6,940,917 proposes to use multicarrier system and use different weighting vector for different carriers. In contrast, the present disclosure proposes to change the beam forming weights (and/or beam steering weights) depending upon how the frequency of the received (and/or transmitted) signal changes with time. Further, according to the present disclosure, only one signal (i.e. radiation at one frequency) is transmitted at a time to make sure that the transmission of signals (radiation) is known, i.e. done in a deterministic way.

More particularly, the present disclosure teaches how to use different weights for different frequencies. The known solutions deal with wideband signals by using 2D filtering or an FFT to separate the received and/or transmitted signal into different frequency bands and then apply different weights to different frequency bands, i.e. they provide solutions in the frequency domain. In contrast, according to the present disclosure the signal dealt with at any time point is limited to a narrowband signal, although the signal can sweep in a wide bandwidth. Due to this constraint, the proposed solution solves the posed problem in the time domain and is thus much more simply. Especially when FMCW is used as the transmitted radiation, this can be done in baseband (beat frequency) which is at a much lower rate than in the RF frequency.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
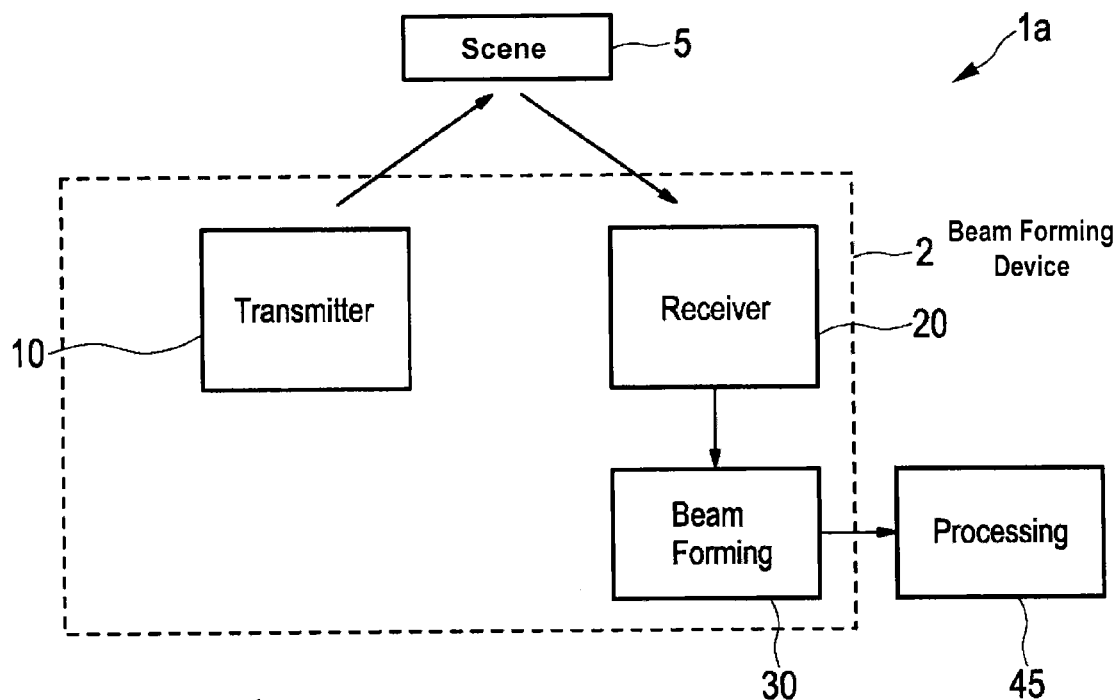
FIG. 1 shows a schematic diagram of a first embodiment of an active imaging device including a beam forming device according to the present disclosure.

Referring now to the drawings, wherein like reference numerals designate identical or corresponding parts throughout the several views, FIG. 1 shows a general layout of an active imaging device 1a according to the present disclosure for imaging a scene 5 including a beam forming device 2 according to the present disclosure. The beam forming device 2 comprises a wideband transmit unit 10 comprising at least one transmit element 11 that transmits radiation towards said scene 5 (said radiation being also referred to as transmit signals), wherein the frequency of the radiation is changing with time in a deterministic way within a wideband frequency range. The beam forming device 2 further comprises a receiver unit 20 comprising at least two receive elements 21, 22 that receive radiation from said scene 5 and that generate receive signals from said received radiation. A beam forming unit 30 is provided that performs beam forming to form a receive beam and obtain beam formed output signals from said receive signals by use of beam forming weights, wherein for different samples or groups of subsequent samples of a receive signal, a sample representing said receive signal at a different frequency, a frequency-dependent weight is used for beam forming, which frequency-dependent weights are adapted to result in a predetermined shape of said receive beam. Further, a processing unit 45 is provided for processing the beam formed output signals of the beam forming unit 30, e.g. to reconstruct an image of the scene 5. However, the beam formed output signals could also be used for other purposes and in other devices than active imaging devices, e.g. for object detection, distance determination, etc.

Figure 2:
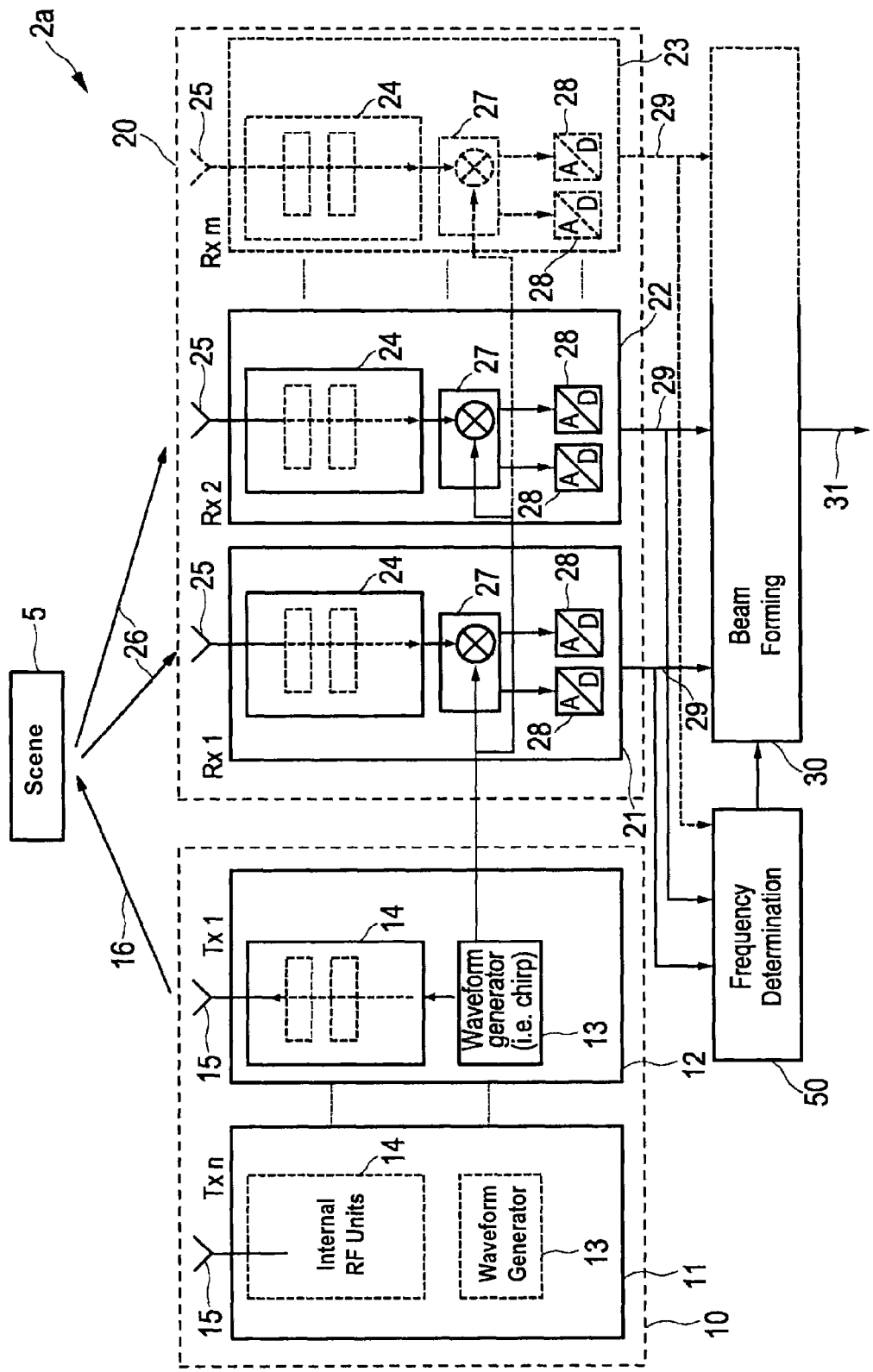
FIG. 2 shows a more detailed diagram of an embodiment of a beam forming device according to the present disclosure.

A schematic diagram of a more detailed exemplary implementation of an embodiment of a beam forming device 2a is depicted in FIG. 2. The transmitter 10 (i.e. the transmit unit) comprises at least one transmit element, here in this example two transmit elements 11, 12. Each transmit element 11, 12 comprises a waveform generator 13 which produces a repetitive waveform which changes its frequency with time, typically a chirp pulse. The generated waveform is then passed to each (of at least two, here three) receive element 21, 22, 23 of the receiver unit 20 and also to the internal RF units 14 (also called transmitter front end) of the transmit elements 11, 12. The internal RF units 14 typically amplify this waveform so that it has the correct power level for transmission.

The radiation 16 is transmitted via the transmitter antenna 15 to the scene 5. Generally, each transmitter antenna 15 is coupled to its own transmit element 11, 12. In other embodiments, however, two or more transmitter antennas 15 can be coupled/switched to a single (common) transmit element. The reflected signal 26 is then received by the different receive antennas 25. In a similar way as the transmitter antennas 15, each receive antenna 25 is generally coupled to its own receive element 21, 22, 23. In other embodiments, however, two or more receive antennas 25 can be coupled/switched to a single (common) receive element.

After several stages of RF amplification (and/or down conversion) stages in the receiver front-end 24, the resulting signal is passed to a mixer 27 (preferably to an I/Q mixer or to a mixer and an I/Q generation circuit, such as Hilbert filter transform) which mixes the signal with the waveform received directly from the transmit elements 11, 12 to produce a complex 'beat frequency' waveform whose frequency corresponds to the distance of the object (e.g. by applying the usual FMCW receiver principle, as explained below).

The complex output of the mixer 27 is then generally filtered and passed to two A/D (analogue to digital) converters 28 which produce digital outputs 29, preferably the I and Q outputs (i.e. an in-phase output and a quadrature output). These outputs 29 are passed to the beam forming unit 30 which amplifies and phase shifts the different received signals 29, so that different beam positions can be formed. The beam formed output signals 31 may then be subject to further processing, e.g. may be used for reconstructing an image of the scene 5 in an active imaging device as explained above.

According to this embodiment of the beam forming device 2*a* according to the present disclosure the A/D outputs 29 are also passed to a frequency determination unit 50, which measures, estimates or predicts the instantaneous frequency of the samples of the corresponding receive signal 26. Based thereon the beam forming unit 30 varies the complex weights in accordance with the instantaneous frequency to obtain a beam of predetermined shape. Based on the antenna geometry and frequency, the weights to beam form the radiation to a certain direction can be calculated mathematically which in theory is to compensate the wave propagation delay to each antenna. The weights can be optimized during a calibration phase. However, during normal operation, either pre-optimized weights will generally be used or the weights will be mathematically calculated on the fly.

Due to the deterministic nature of the transmitted radiation, the instantaneous frequency can be predicted; alternatively, the instantaneous frequency can be measured, for example with a frequency tracking circuit. Further methods for determining the instantaneous frequency exist and can be used here.

Before more details of the present disclosure are explained, beam forming shall be explained in more detail.

Beam forming focuses energy along a specific direction, thus receiving or transmitting a signal in this direction, while rejecting signals from other directions. Radio signals from a set of smaller antenna are combined to realize a larger directional aperture. These antennas may be placed along a line, in a plane, in a systematic or a random manner. These antennas can also be arranged as Single Input Multiple Output (SIMO) system, Multiple Input Single Output (MISO) system or Multiple Input Multiple Output (MIMO) system. In communications, beam forming is used to point an antenna at the signal source to reduce interference and improve communication quality. In imaging systems, beam forming can be used to steer and focus an antenna to different directions to form the image at different position.

Figure 3:
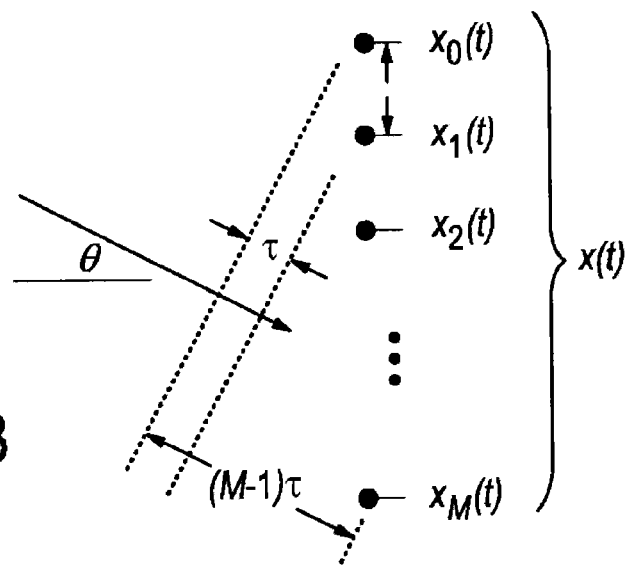
FIG. 3 shows a diagram illustrating the principle of beam forming.

The basic idea of beam forming is to compensate the wave propagation delay across the antenna array to create some kind of interference pattern, in which the majority of the signal energy goes in one angular direction as illustrated in FIG. 3.

There are different approaches for beam forming the signals. One approach is to use true time delays to compensate the time delay. A delay structure with constant group delay is required. This is often generated by optical means. Thus, wideband beam forming can be realized with true time delays. Another approach uses phase shifts to compensate the time delays. For this case, each phase shift changes the phase of the received signal of each antenna in the array by a slightly different amount. By changing the phase shifts for each received (or transmitted) signal, the angle of the received (or transmitted) signal for which the array has the highest sensitivity can be changed and hence the beam can be steered.

The phase shift can be implemented using analog phase shifters. The phases are usually fixed, i.e. they do not change over time, or have limited form of adaptivity. The most used beam forming technique is, to keep the amplitude weights fixed and change only the phase weights to steer a beam. This kind of adaptive antenna is known as a phased array. The output (or input, in the transmission case) of each antenna element is connected to a phase shifter, and the output of these are summed, resulting in a beam in the desired direction. This results in a single beam. If more beams are needed simultaneously, more beam forming networks are used.

Digital beam forming, on the other hand, implements the phase shifts using digital signal processing technique. The received signal from antenna are converted from the analog domain to the digital domain at RF frequency, IF frequency or at baseband. After the analog signals are converted to the digital domain, beam forming is performed by weighting the received signals by multiplying with predetermined complex weights. These complex weights may be determined in advance and may be adaptively changed. Digital beam forming is attractive, because highly sophisticated adaptive signal processing algorithms may be applied, in contrary to the simple methods applied in the analog domain. Multiple beams can be easily generated simultaneously without adding any additional hardware The present disclosure generally relates to digital beam forming which uses phase shift to compensate for the time delay in digital domain. The following discussion will focus on beam forming receivers. However, the present disclosure also applies to beam forming transmitters and MIMO systems.

Figure 4:
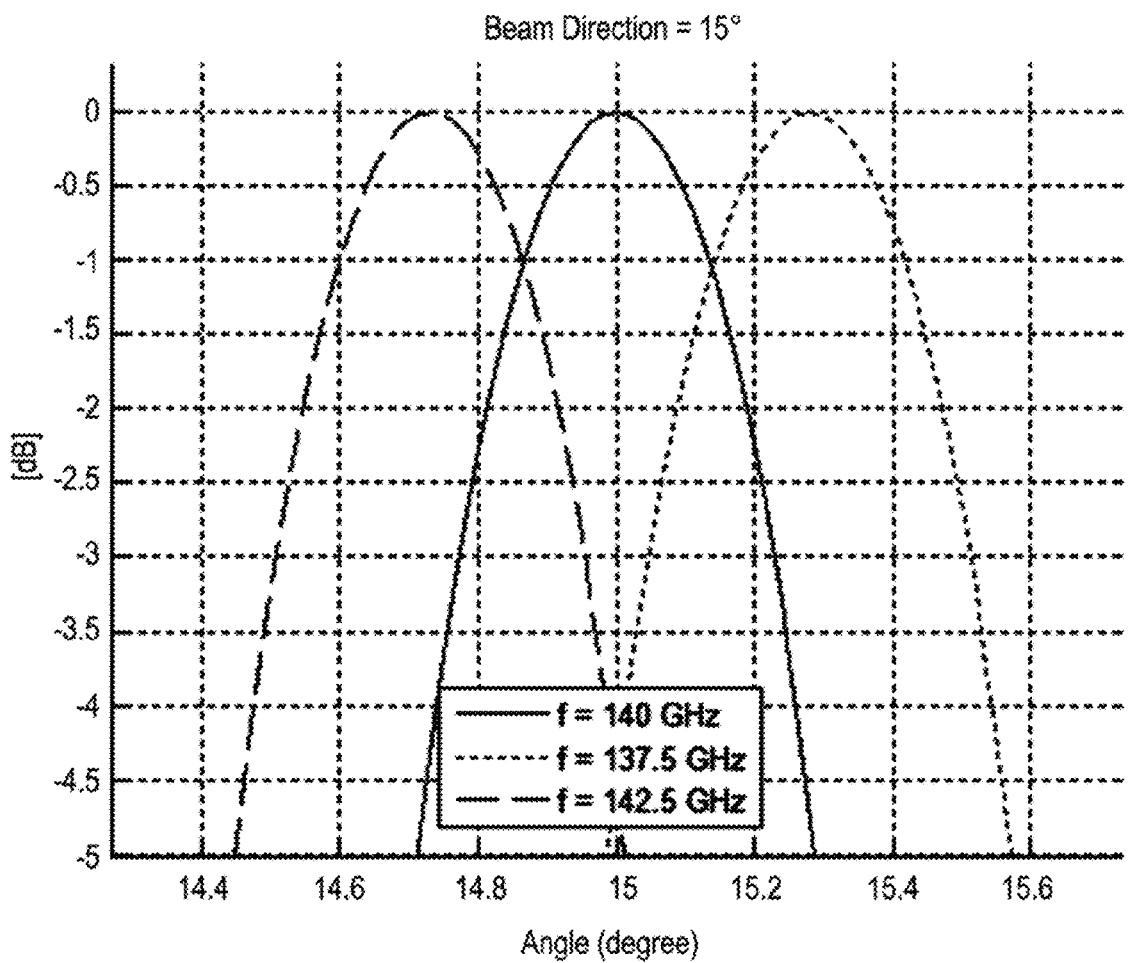
FIG. 4 shows a diagram illustrating beam squint effects of fixed weights beam forming.

For a certain time delay, there is a fixed phase shift for a particular frequency. Different frequencies have different phase shifts. With narrow-band systems the phase shifts are almost the same for all the frequencies in the frequency band, therefore the time delay can be approximated as a single phase shift of the center frequency. With wideband systems this approximation no longer holds, because the wavelength difference between the lower and upper frequency in the frequency band is too large. Therefore, the beam is steered to different directions for different frequencies. This effect is called beam squint. As can be seen in FIG. 4, a fixed weight vector is used to steer the beam. The beams are steered to 14.7 degree at 142.35 GHz, to 15 degree at 140 GHz and to 15.25 degree at 137.65 GHz. The beam steering direction difference increases as the frequency difference increases. In such a wideband system, traditional beam forming methods using fixed phase shifts do not work anymore.

The present disclosure proposes an adaptive beam forming approach which varies its complex weights according to the frequency of the transmitted or received signal. The method is applicable for wideband systems in which the frequency of the transmitted or received signal is sweeping or varying with time in a deterministic manner. Possible example applications could be FMCW radar systems, frequency hopped communications systems or chirp based communications systems, generally for the transmission of any kinds of data. Further, the present disclosure can also be applied to systems where multiple sweeping or time varying signals are sent at the same time, while these signals can be separated in the receiver.

Figure 5:
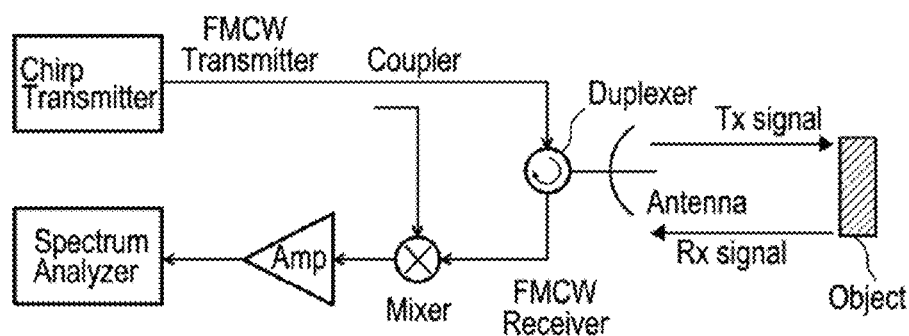
FIG. 5 shows a schematic diagram of a typical (frequency modulated continuous wave) FMCW radar system.

As an example, FMCW is explained here in more detail. A thorough explanation of FMCW is given in G. Brooker, "Understanding Millimeter Wave FMCW Radars", 1st International Conference on Sensing Technology, Nov. 21-23, 2005, Palmerston North, New Zealand, p. 152-157. A FMCW radar, as depicted in FIG. 5, transmits a continuous wave signal that is frequency modulated (frequency is changing with time) to produce a chirp pulse. This is transmitted to the object to be examined and is also fed to the receiver via a coupler. Depending upon the properties of the object the transmitted signal will be reflected by the object and be received by the receiver section of the FMCW radar. Since the transmitted chirp pulse is changing its frequency with time, the exact frequency received for a given time instant depends upon how far away the object is located and the corresponding flight time (Tp). This received signal is then mixed with the transmitted chirp (supplied to the mixer via the coupler) and the output of the mixer has a frequency which is the difference in frequency between the transmitted and received signal. This is known as the beat frequency ($f_b$) and is directly proportional to the distance between the FMCW radar and the object.

The beat frequency signal is converted from analog domain to digital domain by analog to digital converter (ADC). The complex I/Q signal from the ADC is then transformed to frequency domain by Fourier transform to get each frequency bin. These frequency bins are directly related to the range of the target.

Figure 6:
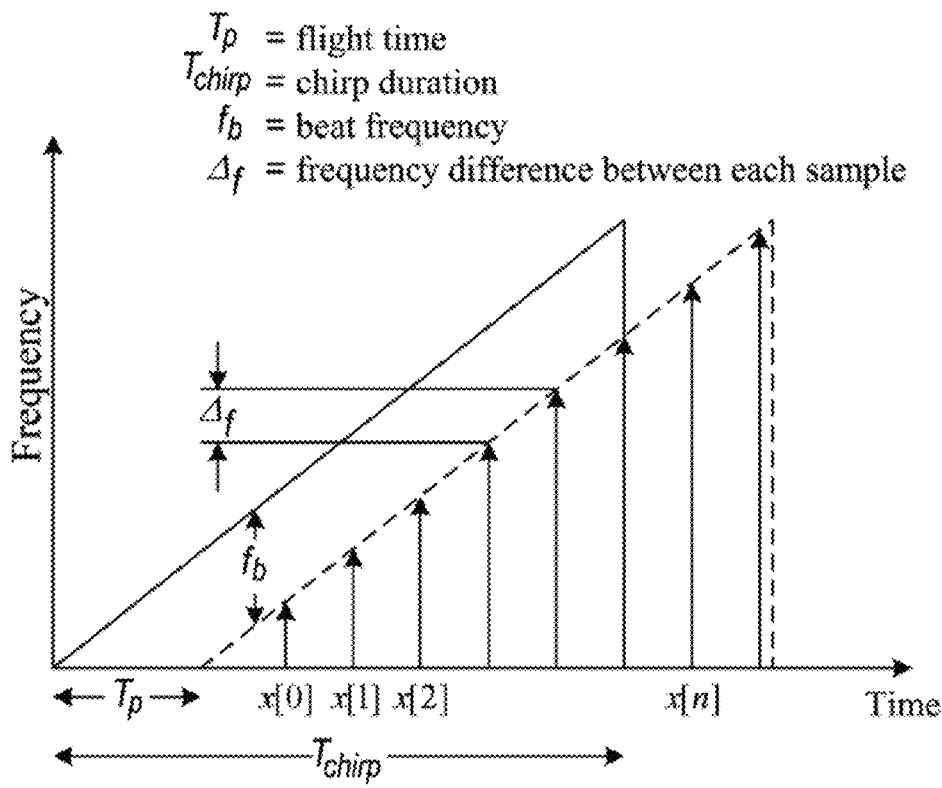
FIG. 6 shows a diagram of a FMCW radar ramp function and sampling.

The frequency variation against time of the transmitter signal (chirp pulse) and the received signal are shown in FIG. 6 as solid and dotted lines respectively. The difference in frequency between the transmitted signal and the received, the beat frequency ($f_b$) is also labelled. As can be seen in FIG. 6, the frequency of the transmitted and received signal is varying with time. At each sampling point the frequency of the signal is known, and the bandwidth of the transmitted and received signal is limited for a given time instant. Therefore, it is proposed to use different weight vectors for different samples, and these weight vectors are optimised for the instantaneous frequency of each sample of the (chirp) waveform.

The model for the FMCW signal may be expressed as:

$$S(t) = \exp\left\{j\left(\omega_0 t + \frac{\alpha}{2} t^2\right)\right\}, \; 0 \leq t \leq T \quad (1)$$

where T is the chirp pulse period, $\omega_0$ is the initial frequency and a is the chirp rate. The pulses are transmitted and reflected back by the target. An echo signal received from a single target is:

$$S_r(t) = \exp\left\{j\left(\omega_0(t - T_p) + \frac{\alpha}{2}(t - T_p)^2\right)\right\} \quad (2)$$

where $T_p$ is the round trip flight time of the transmitted signal. The instantaneous frequency of the received signal reflected from the target is given by:

$$\omega_{inst} = \omega_0 + \alpha(t - T_p). \quad (3)$$

Assuming that the time delay which is to be compensated is $\tau$, the phase shift required for steering the beam is given by:

$$\phi = (\omega_0 + \alpha(t - T_p)) \cdot \tau. \quad (4)$$

In a digital beam forming system, the samples are digitized before the beamforming is applied. Assume the ADC sampling rate is $f_s$, the sampling interval is $\Delta t$, the time t can be replaced with $t = \Delta t \cdot n$ in equation (4). The resulting phase shift is given by:

$$\phi[n] = (\omega_0 + \alpha(\Delta t \cdot n - T_p)) \cdot \tau \quad (5)$$

where n is the number of time samples. From the above equation, it can be seen that a different phase shift is applied for different time samples. Preferably, the phase shift is optimized for each individual time sample according to the individual instantaneous frequency.

Assuming that M channels are available in the antenna array, the phase shift for each channel can be given by:

$$\phi_m[n] = (\omega_0 + \alpha(\Delta t \cdot n - T_p)) \cdot \tau_m, \; m = 1, 2, \ldots, M. \quad (6)$$

The above equation can be rewritten in vector form as:

$$W_{m,n} = \begin{bmatrix} \varphi_1[1] & \varphi_2[1] & \ldots & \varphi_M[1] \\ \varphi_1[2] & \varphi_2[2] & \ldots & \varphi_M[2] \\ \vdots & \vdots & \ddots & \vdots \\ \varphi_1[N] & \varphi_2[N] & \ldots & \varphi_M[N] \end{bmatrix} = \begin{bmatrix} W[1] \\ W[2] \\ \vdots \\ W[N] \end{bmatrix}. \quad (7)$$

Figure 7:
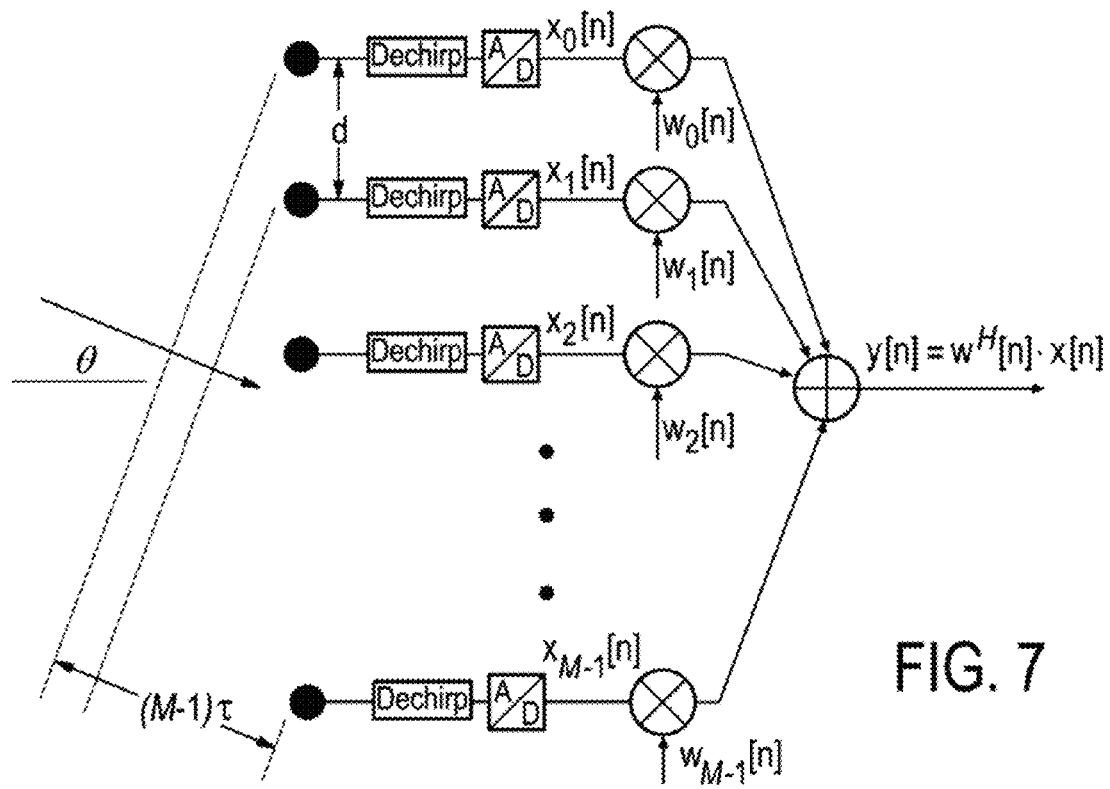
FIG. 7 shows a diagram illustrating wideband beam forming according to the present disclosure.

FIG. 7 show a block diagram illustrating the wideband beam forming method proposed according to the present disclosure. A signal wave coming from a direction θ is received by the array of antennas. The time delay between adjacent antennas is τ. The received signal is de-chirped and then converted into digital domain. The complex digital samples from each channel are multiplied with the complex weights to shift their phase. Finally all the samples after phase shifting are summed up to get the beam formed signal. The complex weights are optimized for each time sample according to the instantaneous frequency of the received signal.

The simulated performance of the proposed wideband beam forming method is shown in FIGS. 8 to 11. The center frequency of the simulation is 140 GHz. The bandwidth of the FMCW signal is 15 GHz. Nine point targets are evenly placed in a two dimensional scene of size 0.3 m×0.5 m.

Figure 8A:
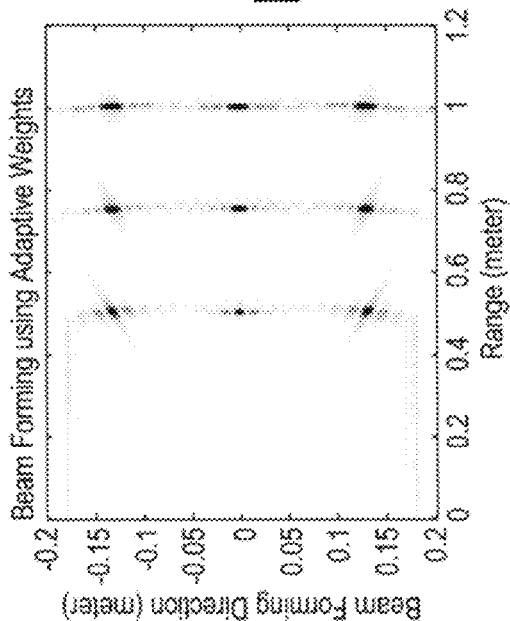
FIG. 8 shows diagrams illustrating the reconstruction of point targets with and without the present disclosure.
Figure 8B:
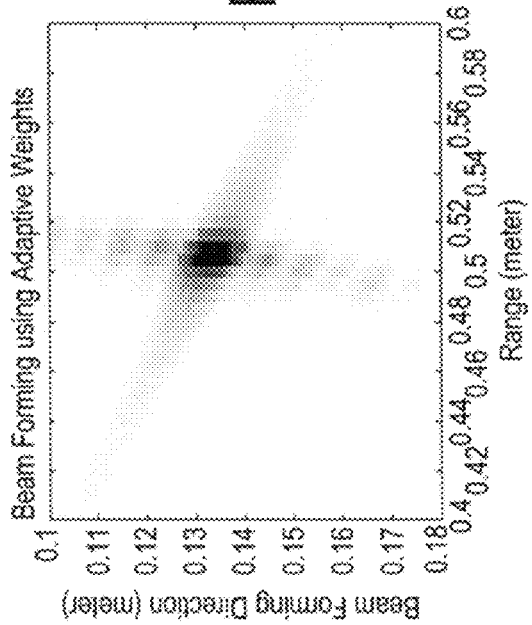
Figure 8C:
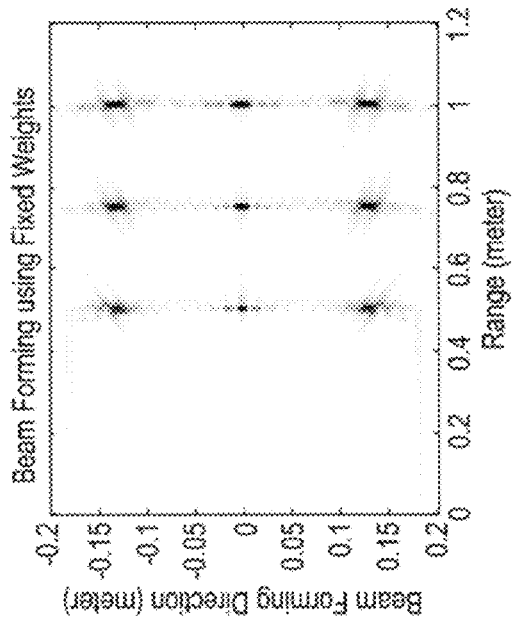
Figure 8D:
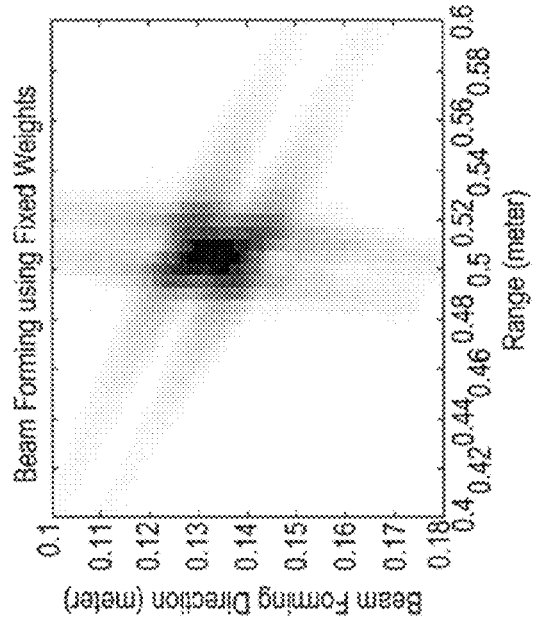

FIG. 8 shows the simulated reconstruction of the point targets using both conventional fixed weight method (FIGS. 8A and 8C) and the proposed adaptive weight method (FIGS. 8B and 8D). As can be seen, the adaptive weight method shows better performance for both the beam forming direction and the range direction. FIGS. 8C and 8D show one of the reconstructed point targets. It is clearly shown in FIG. 8 that the proposed adaptive weights method produce a much smaller point compared to the fixed weight method, which means the proposed adaptive weight method has much better spatial resolution.

Figure 9:
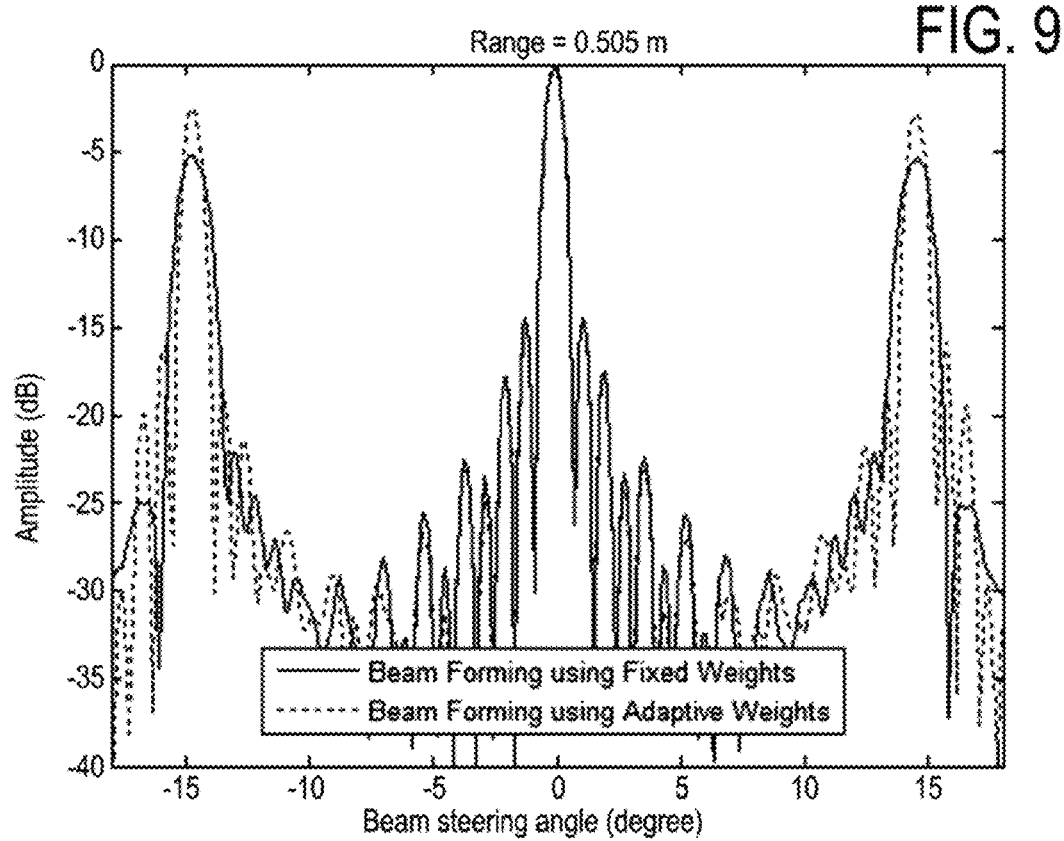
FIG. 9 shows a diagram illustrating a point target response of three targets in the beam forming direction.
Figure 10:
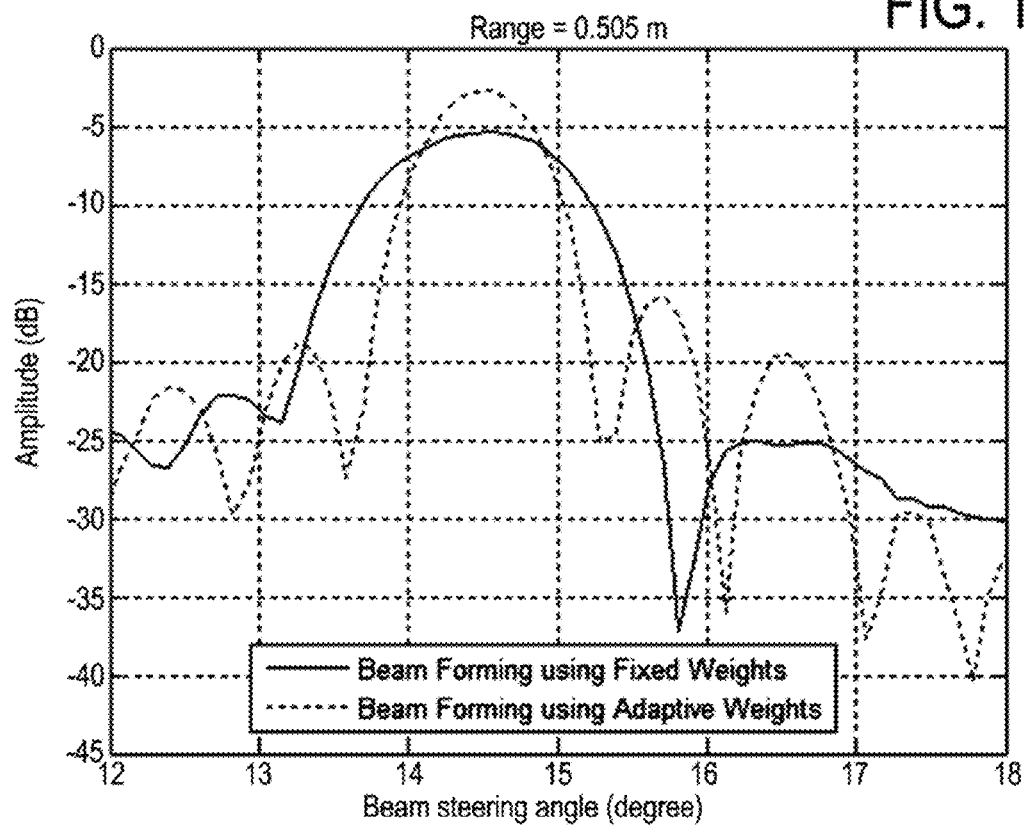
FIG. 10 shows a more detailed diagram illustrating a point target response in the beam forming direction.
Figure 11:
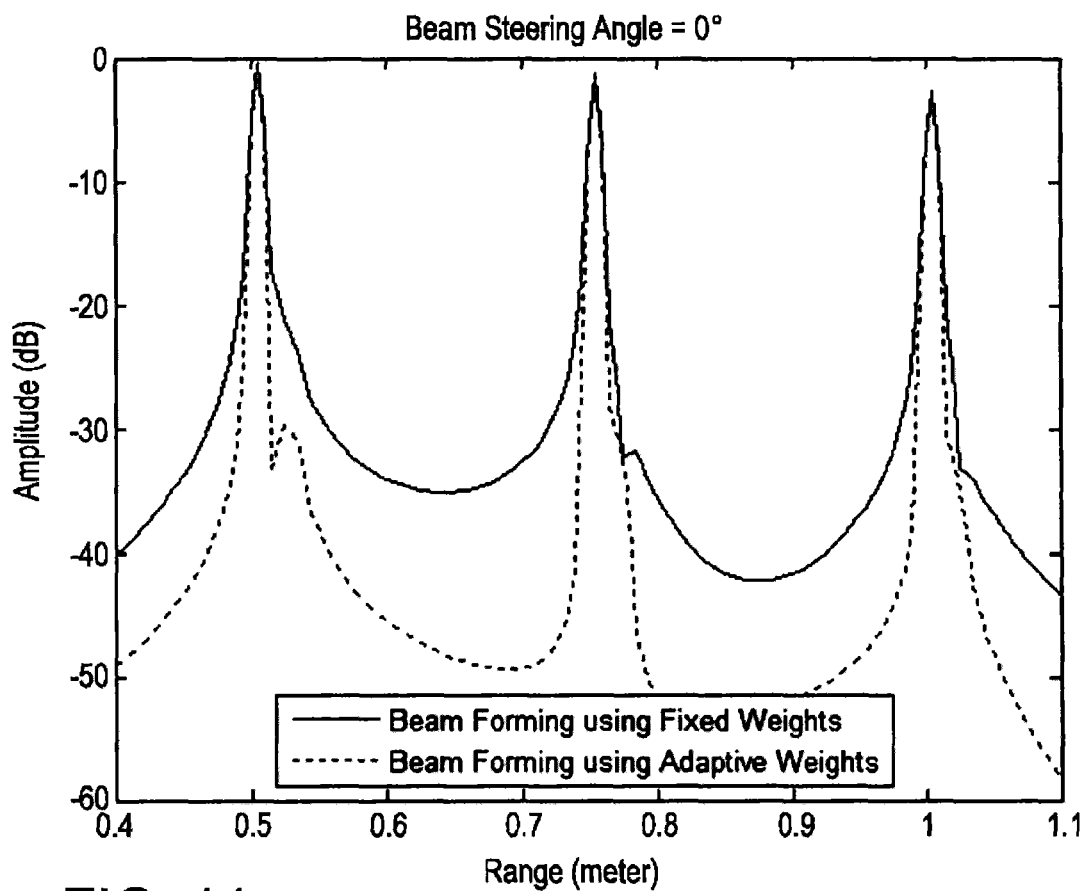
FIG. 11 shows a diagram illustrating a point target response of three targets in the range direction.

FIGS. 9 to 11 show the point target response in the beam forming dimension (FIGS. 9 and 10) and the range dimension (FIG. 11), respectively, for both traditional fixed weight method and the proposed adaptive weight method.

In FIG. 9 the point target response of three targets in the same range distance and different beam forming directions is shown. In the beam forming dimension, as shown in FIG. 9, both methods show no difference when the beam is pointed to the center direction (0°). As long as the beam steers away from the center, the performance of the fixed weights method degrades. The beam width becomes wider and the gain of the beam drops. However, the adaptive weights method maintains almost the same performance as the beam is steered away. The beam width of the proposed method is almost the same for all three directions as shown in FIG. 9. The gain of the beam only reduces by a small amount when the beam is steered to ±14.5°, and compared to the conventional fixed weight method, the reduction in gain of the proposed method is much lower.

An enlarged point target response of one target at 14.5° in the beam forming dimension is shown in FIG. 10. As can be seen, when the beam is steered to 14.5°, the half power beam width (HPBW) of the proposed adaptive weights beam forming method is around 0.7°, while the HPBW of the traditional fixed weights beam forming methods is around 1.4°. Therefore, the proposed adaptive method achieves two times better spatial resolution compared to the conventional method.

In the range dimension, as shown in FIG. 11, the proposed adaptive weight method performs better than the conventional method for all different ranges. The proposed method shows both narrower beam width and higher suppression for the side lobe.

Figure 12:
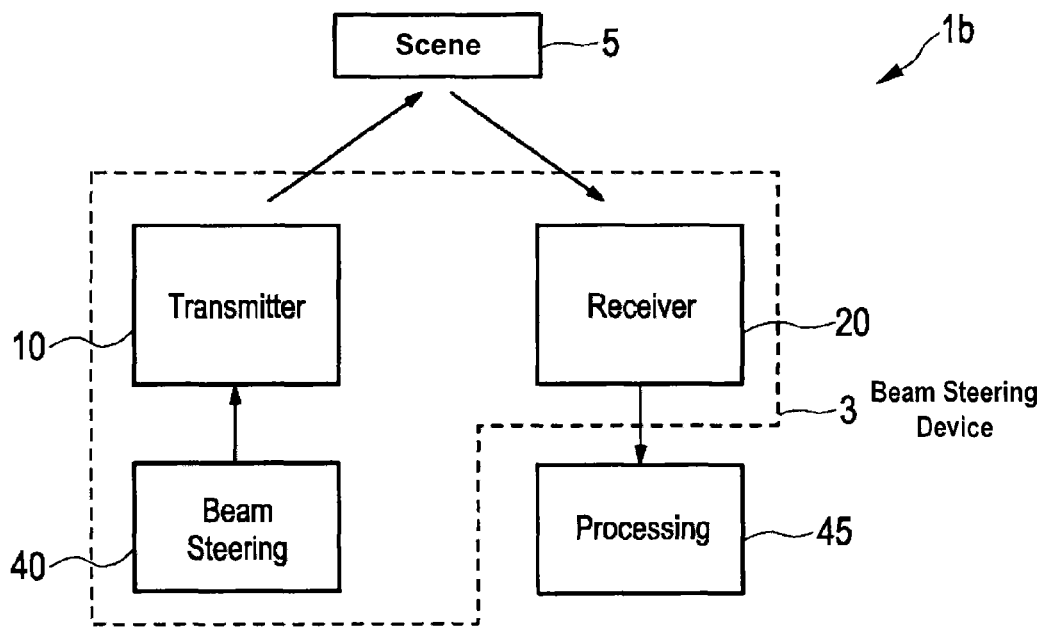
FIG. 12 shows a schematic diagram of a second embodiment of an active imaging device including a beam steering device according to the present disclosure.

A second embodiment of an active imaging device 1b according to the present disclosure including a beam steering device 3 according to the present disclosure is schematically shown in FIG. 12. The beam steering device 3 comprises a wideband transmit unit 10 comprising at least two transmit elements 11, 12 that transmit radiation towards said scene 5, wherein the frequency of the radiation is changing with time in a deterministic way within a wideband frequency range, and a receiver unit 20 comprising at least one receive element 21 that receives radiation from said scene 5 and that generates a receive signal from said received radiation. Further, the beam steering device 1b comprises a beam steering unit 40 that performs beam steering to form a transmit beam from said transmitted radiation by use of beam steering weights, wherein for different samples or groups of subsequent samples of transmitted radiation, a sample representing said transmitted radiation at a different frequency, a frequency-dependent weight is used for beam steering, which frequency-dependent weights are adapted to result in a predetermined shape of said transmit beam. Further, a processing unit 45 is provided for processing the receive signals of the receiver unit 20, e.g. to reconstruct an image of the scene 5. However, the receive signals could also be used for other purposes and in other devices than active imaging devices, e.g. for object detection, distance determination, etc.

Figure 13:
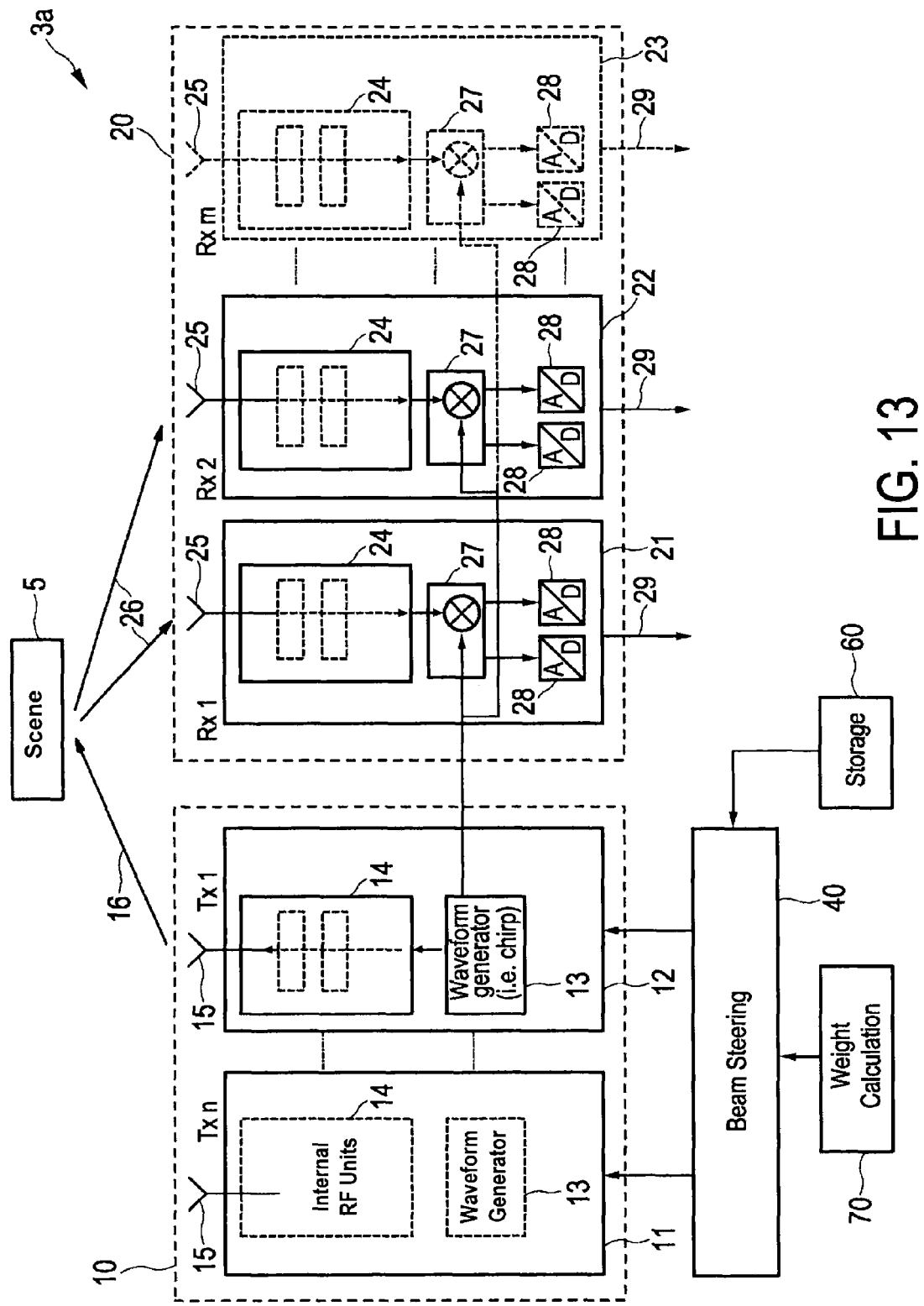
FIG. 13 shows a more detailed diagram of an embodiment of beam steering device according to the present disclosure.

A more detailed exemplary implementation of an embodiment of a beam steering device 3a is schematically shown in FIG. 13, which is to a large extent to the implementation of the beam forming device 2a shown in FIG. 2, except for the beam forming unit 30 which is replaced here by the beam steering unit 40. Optionally, however, a beam forming unit 30 can additionally be provided, but the digital outputs 29 of the receive elements 21, 22, 23 may also be processed differently or used for other purposes.

Further, in this implementation a storage unit 60 is provided that stores the frequency-dependent weights. Such a storage unit 60 can also be provided in a beam forming device 2, 2a. Generally, these frequency-dependent weights can be previously acquired, e.g. during setup of the beam steering device 3a (or the active imaging device 1b), or after the manufacturing and installation, or at regular intervals. The frequency-dependent weights can then be retrieved from the storage unit 60 (whatever weights are stored) and used by the beam steering unit 40 for beam steering during the actual operation of the device.

Still further, in this implementation the beam steering device 3a comprises a weight calculation unit 70 that calculates said frequency-dependent weights by numeric calculation as explained above. Also such a weight calculation unit 70 can be provided in a beam forming device 2, 2a.

While the embodiment of the beam steering device 3a included both a storage unit 60 and a weight calculation unit 70, it is also possible that only one of the storage unit 60 and the weight calculation unit 70 is provided. The same holds for a beam forming device.

Figure 14:
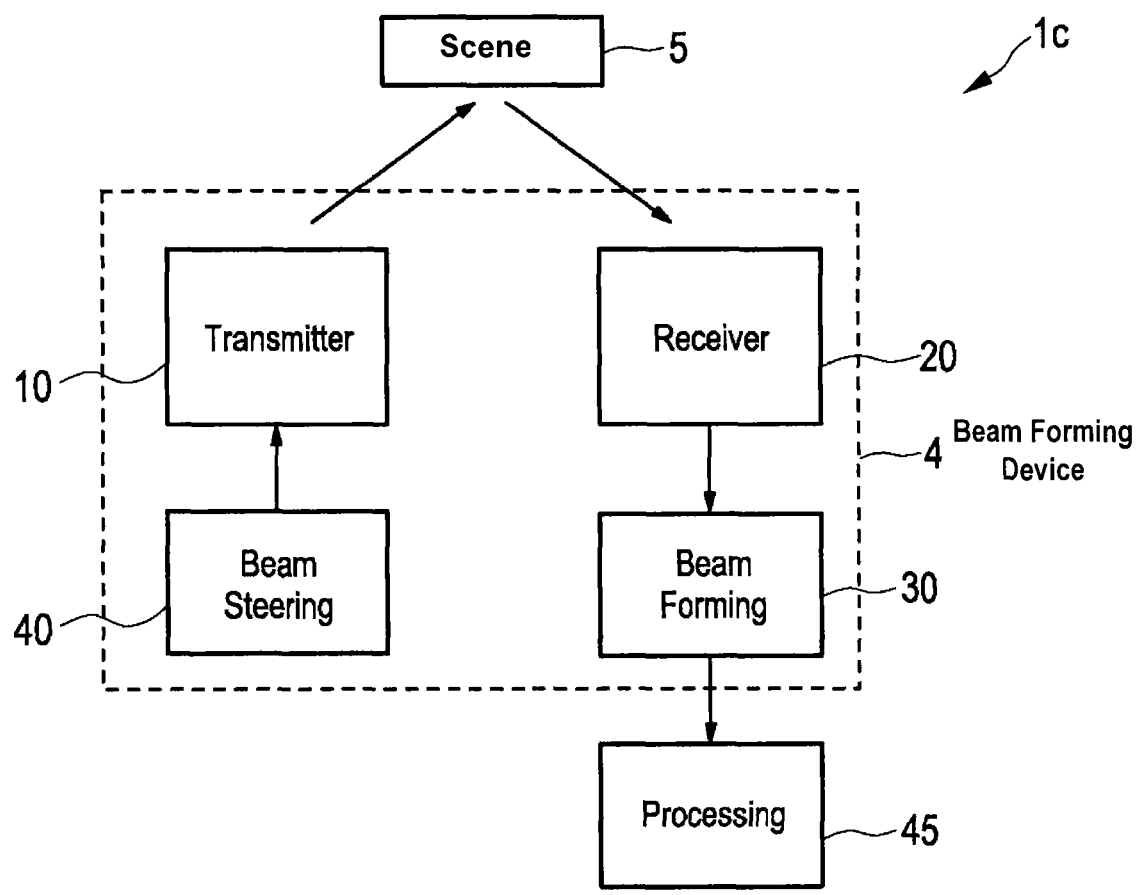
FIG. 14 shows a schematic diagram of a third embodiment of an active imaging device including a beam steering device and a beam forming device according to the present disclosure.

A schematic diagram of a third embodiment of an active imaging device 1c including a beam steering and beam forming device 4 according to the present disclosure is shown in FIG. 14. It includes a beam steering unit 40 as explained above and a beam forming unit 30 to perform beam forming both on the transmitter side and the receiver side.

Generally, in the beam steering device the transmit elements 11, 12 are configured to simultaneously transmit radiation towards said scene 5, wherein the radiation transmitted by different transmit elements is identical.

Still further, in an embodiment the beam steering unit 40 is configured to vary said weights in accordance with the instantaneous frequency to obtain a transmit beam of a predetermined shape, and to use weights that are adapted to the center frequency or average frequency of a groups of subsequent samples of transmitted radiation. Preferably, the beam steering unit 40 is configured to use frequency-dependent phase shifts of said weights for beam steering.

Even further, in a preferred embodiment, transmit units are designed as illumination units that are configured to illuminate a scene.

In summary, the present disclosure provides an active imaging device and method providing optimum beam forming performance and, hence, high imaging spatial resolution, particularly for wideband digital beam forming, both on the transmitter side and/or the receiver side. Further, an appropriately adapted beam forming device and method as well as an appropriately adapted beam steering device and method are proposed. The main advantages of the present disclosure are that optimal beam forming can be achieved with minimal beam width (i.e. no beam squint) and that realization of the present disclosure is easily possible with simple implementations.

Obviously, numerous modifications and variations of the present disclosure are possible in light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention. Further, such a software may also be distributed in other forms, such as via the Internet or other wired or wireless telecommunication systems.

The invention claimed is:

1. A beam forming device comprising:
    wideband transmit circuitry comprising at least one transmit antenna that transmits radiation towards a scene, wherein a frequency of the radiation changes with time in a deterministic way within a wideband frequency range,
    a receiver comprising at least two receive antennas and at least one receive element that receive radiation from said scene and that generate receive signals from said received radiation, and
    beam forming circuitry configured to perform a beam forming to form a receive beam and obtain beam formed output signals from said receive signals based on beam forming weights, wherein:
    for different samples or groups of subsequent samples of a receive signal, a sample representing said receive signal at a different frequency, a frequency-dependent weight is used for the beam forming, and
    frequency-dependent weights are configured to result in a predetermined shape of said receive beam.

2. The beam forming device as claimed in claim 1, wherein said beam forming circuitry is configured to vary said frequency-dependent weights in accordance with an instantaneous frequency to obtain a receive beam of a predetermined shape.

3. The beam forming device as claimed in claim 1, further comprising:
frequency determination circuitry configured to measure, estimate, or predict an instantaneous frequency of the different samples or groups of subsequent samples of the receive signal.

4. The beam forming device as claimed in claim 1, wherein said beam forming circuitry is configured to use weights that are configured to a center frequency or average frequency of the groups of subsequent samples of the receive signal.

5. The beam forming device as claimed in claim 1, wherein said beam forming circuitry is configured to use frequency-dependent phase shifts of said frequency-dependent weights for the beam forming.

6. The beam forming device as claimed in claim 1, further comprising:
a memory that stores said frequency-dependent weights.

7. The beam forming device as claimed in claim 1, further comprising:
a-weight calculation circuitry configured to calculate said frequency-dependent weights by numeric calculation.

8. The beam forming device as claimed in claim 1, wherein said beam forming device is configured for a Multiple Input Single Output (MISO) beam forming, a Single Input Multiple Output (SIMO) beam forming or a Multiple Input Multiple Output (MIMO) beam forming.

9. A beam steering device comprising:
wideband transmit circuitry comprising at least two transmit antennas that transmit radiation towards a scene, wherein a frequency of the radiation changes with time in a deterministic way within a wideband frequency range,
a receiver comprising at least one receive antenna and at least one receive element that receive radiation from said scene and that generate a receive signal from said received radiation, and
beam steering circuitry configured to perform a beam steering to form a transmit beam from said transmitted radiation based on beam steering weights, wherein:
for different samples or groups of subsequent samples of transmitted radiation, a sample representing said transmitted radiation at a different frequency, a frequency-dependent weight is used for the beam steering, and
frequency-dependent weights are configured to result in a predetermined shape of said transmit beam.

10. The beam steering device as claimed in claim 9, wherein said beam steering circuitry is configured to vary said frequency-dependent weights in accordance with an instantaneous frequency to obtain a transmit beam of a predetermined shape.

11. The beam steering device as claimed in claim 9, wherein said beam steering circuitry is configured to use weights that are configured to a center frequency or average frequency of the groups of subsequent samples of a transmit signal.

12. The beam steering device as claimed in claim 9, wherein said beam steering circuitry is configured to use frequency-dependent phase shifts of said frequency-dependent weights for the beam steering.

13. The beam steering device as claimed in claim 9, wherein:
said transmit antennas are configured to simultaneously transmit radiation towards said scene, and
the radiation transmitted by the transmit antennas are identical.

14. The beam steering device as claimed in claim 9, further comprising:
a memory that stores said frequency-dependent weights.

15. The beam steering device as claimed in claim 9, further comprising:
weight calculation circuitry configured to calculate said frequency-dependent weights by numeric calculation.

16. The beam steering device as claimed in claim 9, wherein said beam steering device is configured for a MISO beam steering or a MIMO beam steering.

17. A beam forming and beam steering device comprising:
wideband transmit circuitry comprising at least two transmit antennas that transmit radiation towards a scene, wherein a frequency of the radiation changes with time in a deterministic way within a wideband frequency range,
a receiver comprising at least two receive antennas and at least one receive element that receive radiation from said scene and that generate receive signals from said received radiation,
beam steering circuitry configured to perform a beam steering to form a transmit beam from said transmit signals based on beam steering weights, wherein:
for different samples or groups of subsequent samples of transmitted radiation, a sample representing said transmitted radiation at a different frequency, a frequency-dependent weight is used for the beam steering, and
frequency-dependent weights are configured to result in a predetermined shape of said transmit beam, and
beam forming circuitry configured to perform a beam forming to form a receive beam and obtain beam formed output signals from said receive signals based on beam forming weights, wherein:
for different samples or groups of subsequent samples of a receive signal, a sample representing said receive signal at a different frequency, a frequency-dependent weight is used for the beam forming, and
frequency-dependent weights are configured to result in a predetermined shape of said receive beam.

18. A beam forming method comprising:
transmitting wideband radiation towards a scene, wherein a frequency of the radiation changes with time in a deterministic way within a wideband frequency range,
receiving radiation from said scene,
generating receive signals from said received radiation, and
beam forming to form a receive beam and obtain beam formed output signals from said receive signals based on beam forming weights, wherein:
for different samples or groups of subsequent samples of a receive signal, a sample representing said receive signal at a different frequency, a frequency-dependent weight is used for the beam forming, and
frequency-dependent weights are configured to result in a predetermined shape of said receive beam.

19. A beam steering method comprising:
transmitting wideband radiation towards a scene, wherein a frequency of the radiation changes with time in a deterministic way within a wideband frequency range,
receiving radiation from said scene,
generating a receive signal from said received radiation, and
beam steering to form a transmit beam from said transmitted radiation based on beam steering weights, wherein:

for different samples or groups of subsequent samples of transmitted radiation, a sample representing said transmitted radiation at a different frequency, a frequency-dependent weight is used for the beam steering, and frequency-dependent weights are configured to result in a predetermined shape of said transmit beam.

20. A beam forming and beam steering method comprising:

transmitting wideband radiation towards a scene, wherein a frequency of the radiation changes with time in a deterministic way within a wideband frequency range, receiving radiation from said scene, generating receive signals from said received radiation, beam steering to form a transmit beam from said transmitted radiation based on beam steering weights, wherein:

for different samples or groups of subsequent samples of transmitted radiation, a sample representing said transmitted radiation at a different frequency, a frequency-dependent weight is used for the beam steering, and frequency-dependent weights are configured to result in a predetermined shape of said transmit beam, and beam forming to form a receive beam and obtain beam formed output signals from said receive signals based on beam forming weights, wherein:

for different samples or groups of subsequent samples of a receive signal, a sample representing said receive signal at a different frequency, a frequency-dependent weight is used for the beam forming, and frequency-dependent weights are configured to result in a predetermined shape of said receive beam.

21. An active imaging device for imaging a scene comprising:

a beam forming device as defined in claim 1, a beam steering device as defined in claim 9 or a beam forming and beam steering device as defined in claim 17, and processing circuitry configured to process said receive signals or said beam formed output signals, respectively.

22. An active imaging method for imaging a scene comprising:

a beam forming method as defined in claim 18, a beam steering method as defined in claim 19 or a beam forming and beam steering method as defined in claim 20, and processing said receive signals or said beam formed output signals, respectively.

23. A non-transitory computer readable medium having instructions stored thereon which, when carried out on a computer, cause the computer to perform the beam forming in claim 18, the beam steering in claim 19 or the beam forming and beam steering in claim 20.

* * * * *